United States Patent [19]

Ichikawa et al.

[11] 4,358,852
[45] Nov. 9, 1982

[54] METHOD OF MODULATION AND DEMODULATION OF DATA AND APPARATUS FOR CARRYING OUT THE SAME

[75] Inventors: Shunsuke Ichikawa; Masato Tanaka, both of Tokyo, Japan

[73] Assignee: Sony Corporation, Tokyo, Japan

[21] Appl. No.: 142,030

[22] Filed: Apr. 21, 1980

[30] Foreign Application Priority Data

Apr. 24, 1979 [JP] Japan .................. 54/50976

[51] Int. Cl.$^3$ ............................................. H04L 1/10
[52] U.S. Cl. ....................................... 375/25; 360/40; 371/2; 340/347 DD
[58] Field of Search .................. 340/347 DD; 358/260, 358/133; 371/2; 360/39, 40, 48; 375/25, 37, 26, 30, 31, 34

[56] References Cited

U.S. PATENT DOCUMENTS 3,506,961  4/1970  Abramson et al. ............... 371/2
3,996,613  12/1976  Manning et al. ............... 360/40
4,261,019  4/1981  McClelland ................... 360/40

FOREIGN PATENT DOCUMENTS 1470636  4/1977  United Kingdom .
1518997  7/1978  United Kingdom .

Primary Examiner—Benedict V. Safourek
Attorney, Agent, or Firm—Lewis H. Eslinger; Alvin Sinderbrand

[57] ABSTRACT

A method of modulation and demodulation of data converts data words of four bits to converted data words of twelve bits according to a normal coding scheme in which successive marks or "1" bits are separated by at least five spaces or "0" bits. At least two consecutive four-bit data words are furnished to a logic device that detects whether the last "1" bit of one converted data word corresponding thereto according to the normal coding scheme will be less than five bits from the first "1" bit in the next converted data word, and provides appropriate key bits; and converted data words are selectively provided according to the normal coding scheme and according to an alternate coding scheme in response to such key bits, so that in the modulated data, the "1" bits are always separated from each other by at least five "0" bits. For demodulation, a logic device provides a discrimination bit depending upon whether the converted data words have been modulated according to the normal or the alternate coding scheme, and a selector responsive to the discriminator bit selects data words according to the normal coding scheme and according to the alternate coding scheme. The apparatus for modulating data preferably includes an addressable ROM as a coding device.

9 Claims, 15 Drawing Figures

FIG. 1

| Decimal Number | Data Word q₁ q₂ q₃ q₄ | | | | 12 Bits After Conversion | | | | | | | | | | | |
|---|---|---|---|---|---|---|---|---|---|---|---|---|---|---|---|---|
| | $q_1$ | $q_2$ | $q_3$ | $q_4$ | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ |
| 0  | 0 | 0 | 0 | 0 | 0 | 0 | 0 | 0 | 0 | 1 | 0 | 0 | 0 | 0 | 0 | 0 |
| 1  | 0 | 0 | 0 | 1 | 0 | 0 | 0 | 0 | 0 | 0 | 1 | 0 | 0 | 0 | 0 | 0 |
| 2  | 0 | 0 | 1 | 0 | 0 | 0 | 0 | 0 | 0 | 0 | 0 | 1 | 0 | 0 | 0 | 0 |
| 3  | 0 | 0 | 1 | 1 | 0 | 0 | 0 | 0 | 0 | 0 | 0 | 0 | 1 | 0 | 0 | 0 |
| 4  | 0 | 1 | 0 | 0 | 0 | 1 | 0 | 0 | 0 | 0 | 0 | 0 | 0 | 0 | 0 | 0 |
| 5  | 0 | 1 | 0 | 1 | 0 | 0 | 0 | 0 | 1 | 0 | 0 | 0 | 0 | 0 | 0 | 0 |
| 6  | 0 | 1 | 1 | 0 | 0 | 1 | 0 | 0 | 0 | 0 | 0 | 1 | 0 | 0 | 0 | 0 |
| 7  | 0 | 1 | 1 | 1 | 0 | 1 | 0 | 0 | 0 | 0 | 0 | 0 | 1 | 0 | 0 | 0 |
| 8  | 1 | 0 | 0 | 0 | 0 | 0 | 0 | 1 | 0 | 0 | 0 | 0 | 0 | 0 | 0 | 0 |
| 9  | 1 | 0 | 0 | 1 | 0 | 0 | 1 | 0 | 0 | 0 | 0 | 0 | 0 | 0 | 0 | 0 |
| 10 | 1 | 0 | 1 | 0 | 0 | 0 | 0 | 1 | 0 | 0 | 0 | 0 | 0 | 1 | 0 | 0 |
| 11 | 1 | 0 | 1 | 1 | 0 | 0 | 1 | 0 | 0 | 0 | 0 | 0 | 1 | 0 | 0 | 0 |
| 12 | 1 | 1 | 0 | 0 | 1 | 0 | 0 | 0 | 0 | 0 | 0 | 0 | 0 | 0 | 0 | 0 |
| 13 | 1 | 1 | 0 | 1 | 1 | 0 | 0 | 0 | 0 | 0 | 1 | 0 | 0 | 0 | 0 | 0 |
| 14 | 1 | 1 | 1 | 0 | 1 | 0 | 0 | 0 | 0 | 0 | 0 | 1 | 0 | 0 | 0 | 0 |
| 15 | 1 | 1 | 1 | 1 | 1 | 0 | 0 | 0 | 0 | 0 | 0 | 0 | 1 | 0 | 0 | 0 |

⇔ Conversion

FIG. 2A

| Wn-1 | | | Wn | | |
|---|---|---|---|---|---|
| P'1 P'2 P'3 P'4 | P'5 P'6 P'7 P'8 | P'9 P'10 P'11 P'12 | P1 P2 P3 P4 | P5 P6 P7 P8 | P9 P10 P11 P12 |
| X X X 0 | 0 0 0 0 | 1 0 0 0 | 1 0 0 0 | 0 0 X X | X X X X |
| | | ⇕ | | | |
| X X X 0 | 0 0 0 0 | 0 0 0 1 | 0 0 0 0 | 0 0 X X | X X X X |

FIG. 2B

| Wn-1 | | | Wn | | |
|---|---|---|---|---|---|
| P'1 P'2 P'3 P'4 | P'5 P'6 P'7 P'8 | P'9 P'10 P'11 P'12 | P1 P2 P3 P4 | P5 P6 P7 P8 | P9 P10 P11 P12 |
| X X X 0 | 0 0 0 0 | 1 0 0 0 | 0 1 0 0 | 0 0 X X | X X X X |
| | | ⇕ | | | |
| X X X 0 | 0 0 0 0 | 0 0 1 0 | 0 0 0 0 | 0 0 X X | X X X X |

FIG. 2C

| Wn-1 | | | Wn | | |
|---|---|---|---|---|---|
| P'1 P'2 P'3 P'4 | P'5 P'6 P'7 P'8 | P'9 P'10 P'11 P'12 | P1 P2 P3 P4 | P5 P6 P7 P8 | P9 P10 P11 P12 |
| X X X 0 | 0 0 0 1 | 0 0 0 0 | 1 0 0 0 | 0 0 X X | X X X X |
| | | ⇕ | | | |
| X X X 0 | 0 0 0 0 | 0 1 0 0 | 0 0 0 0 | 0 0 X X | X X X X |

FIG. 3

| [α] | $W_n = (10)$ |||||||||||| $W_{n+1} = (\alpha)$ ||||||||||||
|---|---|---|---|---|---|---|---|---|---|---|---|---|---|---|---|---|---|---|---|---|---|---|---|---|
| | P1 | P2 | P3 | P4 | P5 | P6 | P7 | P8 | P9 | P10 | P11 | P12 | P1 | P2 | P3 | P4 | P5 | P6 | P7 | P8 | P9 | P10 | P11 | P12 |
| 4  | 0 | 0 | 0 | 1 | 0 | 0 | 0 | 0 | 0 | 0 | 0 | 1 | 0 | 0 | 0 | 0 | 0 | 0 | 0 | 0 | 0 | 0 | 0 | 0 |
| 6  | 0 | 0 | 0 | 1 | 0 | 0 | 0 | 0 | 0 | 0 | 0 | 1 | 0 | 0 | 0 | 0 | 0 | 1 | 0 | 0 | 0 | 0 | 0 | 0 |
| 7  | 0 | 0 | 0 | 0 | 1 | 0 | 0 | 0 | 0 | 0 | 0 | 1 | 0 | 0 | 0 | 0 | 0 | 1 | 0 | 0 | 0 | 0 | 0 | 0 |
| 9  | 0 | 0 | 0 | 0 | 1 | 0 | 0 | 0 | 0 | 0 | 1 | 0 | 0 | 0 | 0 | 0 | 0 | 0 | 0 | 0 | 0 | 0 | 0 | 0 |
| 11 | 0 | 0 | 0 | 0 | 1 | 0 | 0 | 0 | 0 | 0 | 1 | 0 | 0 | 0 | 0 | 0 | 0 | 1 | 0 | 0 | 0 | 0 | 0 | 0 |
| 12 | 0 | 0 | 0 | 1 | 0 | 0 | 0 | 0 | 0 | 0 | 1 | 0 | 0 | 0 | 0 | 0 | 0 | 0 | 0 | 0 | 0 | 0 | 0 | 0 |
| 13 | 0 | 0 | 0 | 1 | 0 | 0 | 0 | 0 | 0 | 0 | 1 | 0 | 0 | 0 | 0 | 0 | 1 | 0 | 0 | 0 | 0 | 0 | 0 | 0 |
| 14 | 0 | 0 | 0 | 1 | 0 | 0 | 0 | 0 | 0 | 0 | 1 | 0 | 0 | 0 | 0 | 0 | 0 | 1 | 0 | 0 | 0 | 0 | 0 | 0 |
| 15 | 0 | 0 | 0 | 0 | 1 | 0 | 0 | 0 | 0 | 0 | 1 | 0 | 0 | 0 | 0 | 0 | 1 | 0 | 0 | 0 | 0 | 0 | 0 | 0 |

METHOD OF MODULATION AND DEMODULATION OF DATA AND APPARATUS FOR CARRYING OUT THE SAME

BACKGROUND OF THE INVENTION

1. Field of the Invention

The present invention relates generally to a method of modulation and demodulation of a data signal and an apparatus for carrying the same out, and is directed more particularly to a method of data modulation and an apparatus for carrying the same suitable for use in magnetically recording (or reproducing) data, in which pulse-code-modulating (PCM) is utilized, for example, for audio signal, in recording the digitized sound signals on a disc and reproducing the recorded signals on the disc.

2. Description of the Prior Art

In conventional magnetic recording and reproducing, in order to record data at high density and reproduce the data without error, it is desired that the minimum distance of magnetic inversions is long and that the maximum distance therebetween is short. Also, it is important that the width of a window used for detecting the data be selected wide. To achieve this end, a modulation system has been proposed earlier in which a data word of three bits is converted into a code word of six bits and, in the finally provided code word of six bits, at least two "0"s or spaces occur between successive "1"s or marks. This modulation system is commonly known as 3PM (three position modulation).

In fact, the bit number, or word length of data words of a PCM signal, such as that provided by pulse-code-modulating an audio signal, and is commonly selected to be $2^n$, for the reason that a digital circuit for processing data is usually formed of conventional circuit elements so as to achieve a simple circuit construction. For example, when PCM data of 16 bits are modulated by 3PM, since the bitnumber such PCM of data is not a multiple of three, the data words can not be processed by conventional digital division at their inherent word boundaries.

OBJECTS AND SUMMARY OF THE INVENTION

Accordingly, an object of the present invention is to provide a method of data modulation and demodulation and apparatus therefor so that data can be recorded and reproduced at high density.

Another object of the invention is to provide a method of data modulation and demodulation and apparatus therefor, in which a data word of four bits is converted to a code word of twelve bits so that it is suitable for modulating a data word having a bit number of four or a multiple of four.

A further object of the invention is to provide a method of data modulation and demodulation and an apparatus therefor by which the density ratio (DR) is improved as compared with that of the 3PM and by which the construction of an encoder and a decoder can be simplified.

A yet further object of the invention is to provide a method of data modulation and demodulation and apparatus therefor, in which the construction of an encoder and a decoder is relatively simple even though the data words have a high bit number.

According to an aspect of the present invention, a method of modulation and demodulation of data by converting data words of a length of four binary bits to data words of a length of twelve binary bits in which successive bits of one type, such as marks or "1" bits, are separated by at least a predetermined plurality of bits, preferably at least five bits, of the complementary type, such as spaces or "0" bits, comprises the steps of providing at least two consecutive data words of four bits to a logic device; detecting whether the at least two consecutive converted words of twelve bits corresponding thereto according to one predetermined coding scheme will contain successive bits of said one type separated by fewer than said predetermined plurality of bits of said complemetary type; providing converted data words of twelve bits according to said one predetermined coding scheme if it is detected that said successive bits of said one type will be separated by at least predetermined plurality of bits of said complementary type, and providing the converted data words according to another coding scheme if it is detected that said successive bits will not be separated by at least said predetermined plurality of bits, so that the sequence of data words of twelve bits so encoded will have successive bits of said complementary type; receiving at least two consecutive ones of said converted data words of twelve bits; determining whether said converted data words have been provided according to said one coding scheme or said other coding scheme; and demodulating said converted data words of twelve bits into data words of four bits according to the determined coding scheme for the corresponding converted data words of twelve bits.

According to another aspect of the present invention, an apparatus for carrying the above method of modulation of data out by converting data words of a length of four binary bits to data words of a length of twelve binary bits according to a predetermined coding scheme in which successive bits of one type are separated by at least a predetermined plurality of bits of the complementary type comprises receiving means for receiving a plurality of successive four-bit data words; logic means coupled with the receiving means to determine whether a bit of said one type in a first one of said converted data words according to the predetermined coding scheme and a bit in the next successive one of said converted data words according to the predetermined coding scheme will be separated from each other by less than the predetermined plurality of bits of the complementary type; coding means for selectively providing converted data words according to the predetermined coding scheme and according to an alternate coding scheme; and selecting means coupled to the coding means and responsive to the logic means to cause said coding means to provide said converted data words according to the predetermined coding scheme and said alternate coding scheme when said bits of one type in said converted data words according to said predetermined coding scheme are determined to be separated by at least said predetermined plurality, and by less than said predetermined plurality, respectively, of bits of said complementary type.

Apparatus for providing a complementary demodulation function reconverts the converted data words of twelve bits back to data words of four bits, and such apparatus comprises receiving means for receiving at least two successive converted data words of twelve bits; logic means for detecting whether bits of the one type occur at certain predetermined bit positions in the successive converted data words and providing a discrimination signal in response to such detecting; means providing a decoded first data word of four bits according to the predetermined coding scheme and a second data word of four bits according to the alternate coding scheme; and selector means responsive to the discriminating signal to select one of the decoded first and second data words.

Other objects, features and advantages of the present invention will become apparent from the following description taken in conjunction with the accompanying drawings.

BRIEF DESCRIPTION OF THE DRAWINGS

FIGS. 1, 2A, 2B, 2C and 3 are respectively tables showing forms of code conversion;

DESCRIPTION OF THE PREFERRED EMBODIMENT

Figure 4:
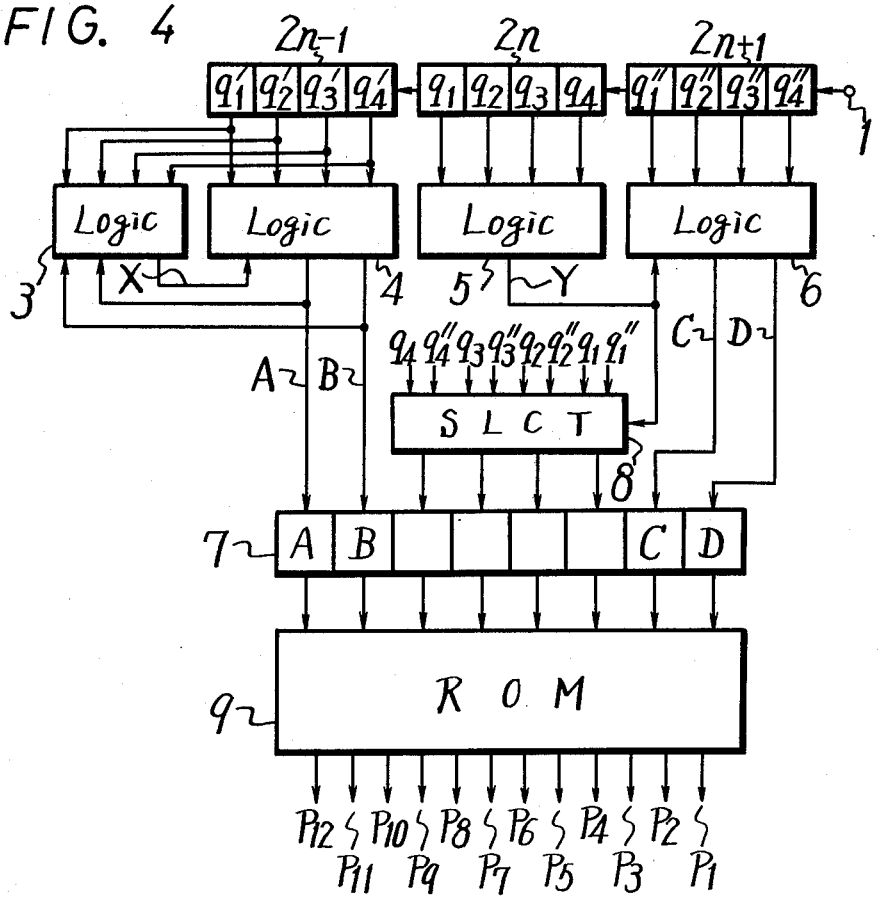
FIG. 4 is a block diagram showing an example of an encoder according to the present invention.

The present invention will be hereinafter described with reference to the attached drawings.

Firstly, the data conversion according to this invention will be now described. According to the present invention, in a code which is converted, at least five "0"'s or spaces occur between two successive "1"'s or marks. Accordingly, the minimum distance d between two magnetized inversions is six bit lengths. If the length of a single time slot upon data transmission is expressed as T, the minimum period T min of magnetized inversion is expressed as follows:

$$T\min = \left(\frac{4}{12}\right) \times 6 \times T = 2 \times T$$

Thus, the density ratio DR of the data becomes as follows:

$$DR = \frac{T\min}{T} = 2$$

This density ratio DR is larger than that (DR=1.5) achieved with 3PM. Therefore, according to the invention, the data can be transmitted with relatively high efficiency.

At this time, a width $T_W$ of a detected window can be expressed:

$$T_W = \left(\frac{4}{12}\right) \times T = \frac{T}{3}$$

This width (T/3) is narrower than that ($T_W$=(T/2)) of the 3PM. However, the narrower window does not pose a serious problem as the nonuniformity in speed of a magnetic recording and reproducing apparatus or rotary disc player can be substantially reduced to accommodate the rather narrower width $T_W$ of the detecting window.

Now, an embodiment of the present invention will be described.

FIGS. 1, 2, and 3 are conversion tables showing the algorithm of the data conversion. FIG. 1 shows the fundamental conversion Table. Data words formed of four bits q1, q2, q3, and q4 are encoded as code words of twelve bits p1, p2, p3, . . . p12 and then transmitted (or recorded). Upon receiving (or reproducing), the code words of twelve bits are decoded as data words of four bits. The data word is formed of a combination of "1"'s and "0"'s to correspond to equivalent decimal numbers 0 to 15. For each converted code word, it is apparent that within the twelve-bit word, at least five "0"'s occur between successive "1"'s. However, when two or more successive words are considered, it becomes apparent that there are combinations of successive words in which the above rule is not satisfied. One such instance occurs when one word in which the five bits are 10000 or 01000 is followed by a second word in which the first two bits are 10 or 01. In the case of the decimal number [10], the last three bits appear as 100 and if the next code word begins with only two "0"'s, the number of "0"'s between successive "1"'s is less than five.

FIGS. 2A-2C show the conversion tables used when the first of the two code words represents the decimal number [2, 3, 6, 7, 11, 14, or 15], and FIG. 3 shows the conversion table used when the first of the two code words represents the number [10].

If it is assumed that a certain one word is taken as $W_{n-1}$ and the following one word as $W_n$ when the last four bits p9', p10', p11', and p12' of word $W_{n-1}$ are 1000 and the first bit p1 of word $W_n$ is "1", the "1"'s in the positions of bits p9' and p1 are changed to "0"'s and a 1"1" is placed in the position of bit p12'. Thus, the six bits p1 to p6 are all made "0" in accordance with the conversion table of FIG. 2A. Similarly, when the last four bits p9', p10' p11', and p12' of word $W_{n-1}$ are 1000 and the first two bits p1 and p2 of word $W_n$ are 01, the "1"'s of bits p9' and p2 are changed to "0"'s and a "1" is placed in the position so that the six of p11' and bits p1 to p6 are all made "0" in accordance with the conversion table of FIG. 2B. Likewise, when the last five bits p8', p9', p10', p11' and p12' of word $W_{n-1}$ are 10000 and the first bit p1 of word $W_n$ is "1", "1" the "1"'s in the positions of p8' and p1 are changed to "0"'s and a "1" is placed in the position of p10' and so that the six bits p1 to p6 are made "0" in accordance with the conversion table of FIG. 2C. In the conversion tables of FIGS. 2A to 2C, the bits at the positions marked with an "X" are ignored, or they remain in their original form after conversion.

The first principle rule of the conversion in the Table of FIG. 2 is that one of the last three bis of word $W_{n-1}$ is converted to a "1" in a fashion that distinguishes the converted code word from all the code words of twelve bits shown in the Table of FIG. 1, and the second principle rule is that the original (unconverted) word can be distinguished by the six bits thereof other than the six bits of the connected data word that are made "0".

When the word $W_n$ is [10] and the following word $W_{n+1}$ is [α], the form of the combination of these words [10−α] or a total compound data word of twenty four bits is converted to the form shown in the conversion table of FIG. 3. Specifically, the code word [10] is converted to have a "1" at the position of either p4 or p5 and at the position of either p11 or p12. As the result of such a conversion, the code word of [10], which represents the same value, is distinguished by the following code word of [α]. Although several twelve bit code words $W_{n+1}$, upon conversion, take on identical forms to some of the code words as shown in the table of FIG. 1 or FIG. 2, these words can be distinguished by consideration of the prior word $W_n$ of [10].

The algorithm for the above operation to simplify the construction of an encoder and a decoder.

FIG. 4 shows an embodiment of the encoder (modulator) according to the present invention. In this embodiment, information data, each word of which consists of four bits, are supplied through an input terminal 1 to shift registers $2_{n-1}$, $2_n$, and $2_{n+}$ each having a capacity of four bits. In each of shift registers $2_{n-1}$, $2_n$, and $2_{n+1}$, data words $V_{n-1}$, Vn, and $V_{n+1}$ are set, respectively. The encoder generates the code word $W_n$ of twelve bits corresponding to the word Vn.

The four bits of the prior word Vn−1 are supplied to a logic circuit 3 which then produces a discrimination bit X. This discrimination bit X and the four bits of word $V_{n-1}$ are all furnished to a logic circuit 4 which produces key bits A and B. The key bits A and B are supplied to logic circuit 3 to be used to produce the discrimination bit X. The four bits of word Vn are supplied to a logic circuit 5 which then produces a discrimination bit Y. This discrimination bit Y and the four bits of the following word $V_{n+1}$ are all furnished to a logic circuit 6 which then produces key bits C and D. The key bits A, B, C and D are set in an address register 7. This address register 7 has a capacity of eight bits, so that in addition to the four key bits A, B, C, and D, four bits of word $V_{n+1}$ or $V_n$, which are selected by a selector 8 controlled by the discrimination bit Y, are set into register 7. Address codes having a length of eight bits are generated in the address register 7 and are furnished are to a ROM (read only memory) 9 which then generates the code word $W_n$ of twelve bits corresponding to the address codes. The code word $W_n$ thus generated is converted into a series code by a parallel-series converter (not shown) and then is supplied to the transmission path, which can be a magnetic recording medium or the like.

Figure 5:
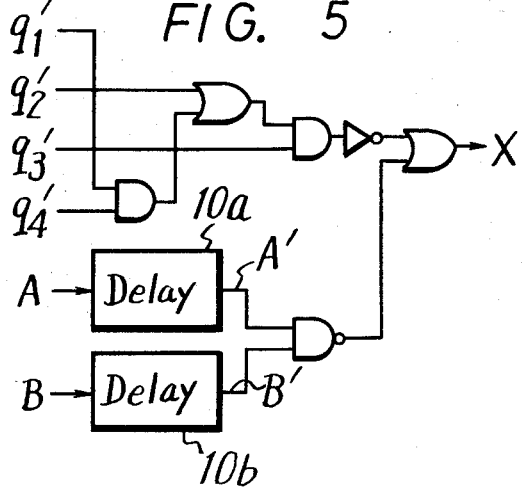
FIGS. 5, 6, 7 and 8 are block diagrams respectively showing parts of the encoder shown in FIG. 4.

A detailed view of an embodiment of the logic circuit 3 is shown in FIG. 5. In this embodiment, 10a and 10b are each delay circuits which produce key bits A′ and B′ in response to the digital value of the prior word $V_{n-2}$. The prior key bits A′, B′ and the four bits q1′, q2′, q3′, q4′ of word $V_{n-1}$ are fed to the logic circuit 3. Thus, the logic circuit 3 generates the discrimination bit X which is expressed according to the following logic equation:

$X = A' \cdot B' + q3' \cdot (q2' + q1' \cdot q4')$

Therefore, whenever the discrimination bit X takes on the value "1", it is apparent that the either word $V_{n-2}$ is not [10] or word $V_{n-1}$ is not any of [6] [7] [11] [14] and [15].

Figure 6:
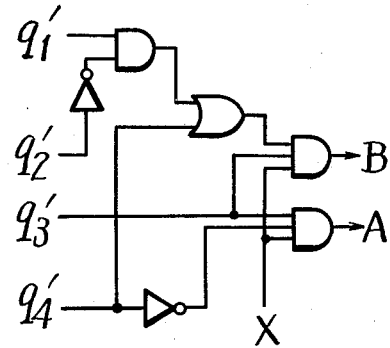

An example embodiment of the logic circuit 4 is shown in FIG. 6. In this embodiment, the discrimination bit X and the four bits q1′ to q4′ are fed to the logic circuit 4. The key bits A and B produced therein are respectively expressed as follows:

$A = q3' \cdot q4' \cdot X$ $B = q3' \cdot (q4' + q1' \cdot q2') \cdot X$

Accordingly, by the key bits A and B correspond to values of the just prior word $V_{n-1}$ as shown in the following Table.

TABLE

| A | B | Value of word $V_{n-1}$ |
|---|---|---|
| 1 | 1 | [10] |
| 1 | 0 | [2, 6, 14] |
| 0 | 1 | [3, 7, 11, 15] |
| 0 | 0 | [0, 1, 4, 5, 8, 9, 12, 13] or [α] in the case of [10 − α] |

Figure 7:
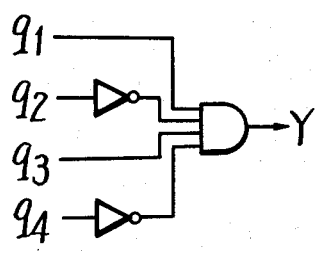

An embodiment of the logic circuit 5 is shown in FIG. 7. This logic circuit 5 produces the discrimination bit Y which is expressed as follows:

$Y = q1 \cdot q2 \cdot q3 \cdot q4$

In other words, only when the word $V_n$ is [10], does the discrimination bit Y take on the value Y="1".

Figure 8:
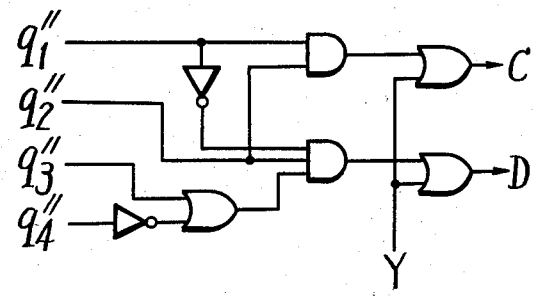

An example of logic circuit 6 is shown in FIG. 8. Here, the four bits q1″ to q4″ of the following word $V_{n+1}$ and discrimination bit Y are all furnished to the logic circuit 6 so that it produces the key bits C and D which are respectively expressed as follows:

$C = q1'' \cdot q2'' + Y$ $D = q1'' \cdot q2'' \cdot (q3'' + q4'') + Y$

The discrimination bits C and D, correspond to values of words $V_n$ and $V_{n+1}$ as indicated in the following Table.

TABLE

| C | D | Value of word $V_{n+1}$ |
|---|---|---|
| 1 | 1 | $V_n$ = [10] |
| 1 | 0 | [12, 13, 14, 15] |
| 0 | 1 | [4, 6, 7] |
| 0 | 0 | [0, 1, 2, 3, 5, 8, 9, 10, 11] |

In the event that the discrimination bit Y is "1", namely when $V_n$=[10], since the form of word $V_n$ at that time is conditioned upon the form of the following word $V_{n+1}$=[α] as shown in the Table of FIG. 3, the word $V_{n+1}$ is set at the address register 7 at this time.

Thus, the address codes A, B, q4, q3, q2, q1, C, D (or A, B, q4″, q3″, q2″, q1″ C, D) of a word length of eight bits set in the address register 7 are used to generate the code word of a length of twelve bits from the ROM 9. This ROM 9 is so constructed that it carries out the code conversion in accordance with the tables of FIGs. 1, 2, and 3. When the data word of four bits in converted to the code word of twelve bits, it is necessary to know or to be able to discriminate what the data words are preceding and following the data word being processed. Therefore even in the simplest method, the data of at least three words (twelve bits) must be discriminated. However, according to this invention, since it is sufficient to use an address code of eight bits, the construction of the encoder can be simplified. Further, not only the encoder but also the construction of the decoder can be made simple for the following reasons.

Figure 9:
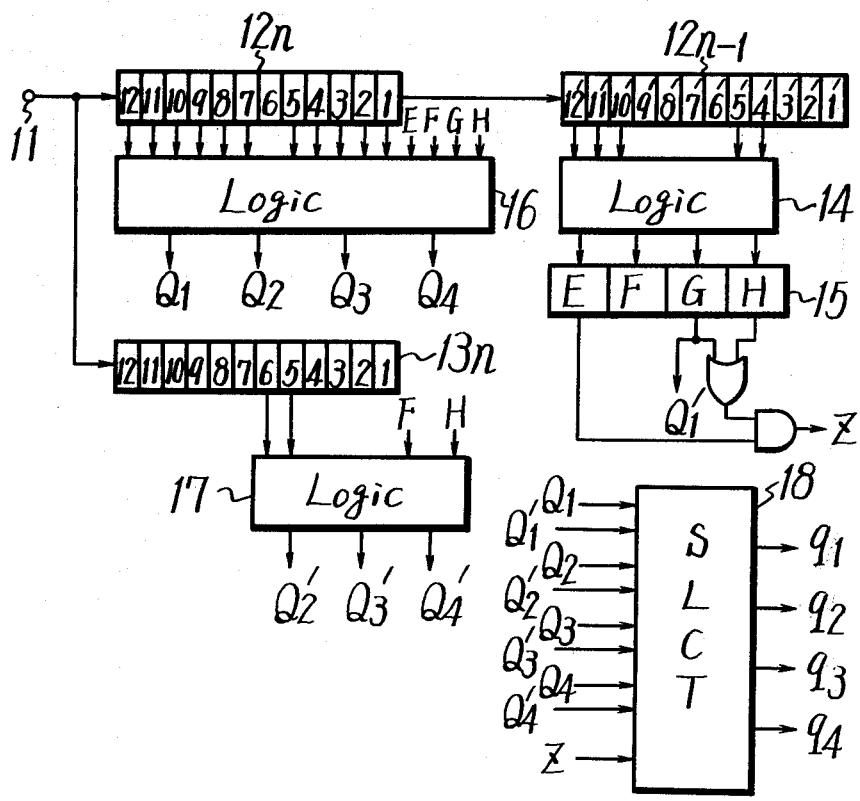
FIG. 9 is a block diagram showing an example of a decoder according to the present invention.

An embodiment of the decoder according to the present invention is shown in FIG. 9. In FIG. 9, an input terminal 11 receives a code converted to a series code. The word $W_n$ is set in shift registers 12n and 13n, each having a capacity of twelve, and the word $W_{n-1}$ just preceding word $W_n$ is set in a shift register 12n−1, also having a capacity of twelve bits. The five bits p4', p5', p10', p11', and p12' in word $W_{n-1}$ are supplied to a logic circuit 14 which then produces key bits E, F, G, and H which are in turn furnished to a shift register 15. Eleven bits of word $W_n$, that is, all the bits except the bit p6 thereof, and key bits E, F, G, H are furnished to a logic circuit 16 which then decodes word $w_n$ and delivers the four bits Q1, Q2, Q3 and Q4 of the data word. Further, two bits p5 and p6 of word $W_n$ and key bits F and H are fed to a logic circuit 17 which then produces three bits Q2', Q3' and Q4' of the data word. In this case, the key bit G is used as the remaining one bit Q1'.

Further, a discrimination bit Z is formed of the key bits E, G and H. The four bits Q1, Q2, Q3, Q4 and the four bits Q1', Q2', Q3' and Q4' of the data word are fed to a selector 18. In this case, one set of four bits is selected by the discrimination bit Z and then data words composed of four bits q1, q2, q3, q4 corresponding to word $W_n$ are derived from the selector 18.

This embodiment can be further simplified by omitting one of the two shift registers 12n and 13n.

Figure 10:
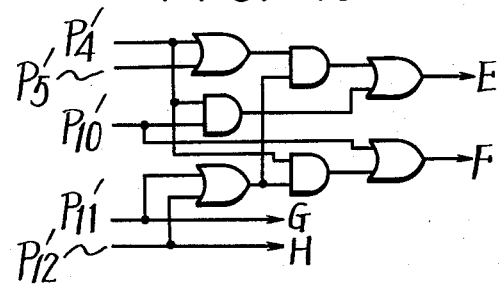
FIGS. 10, 11, 12 and 13 are respectively block diagrams showing respective parts of the decoder shown in FIG. 9.

FIG. 10 shows an example of the logic circuit 14 which generates the key bits E, F, G, and H according to the following logic equations:

$$E = (p4' + p5') \cdot (p11' + p12') + p4' \cdot p10'$$

$$F = p4' \cdot (p11' + p12') + p10'$$

$$G = p11'$$

$$H = p12'$$

Accordingly, key bit E having the value E="1" indicates [10] when prior word $W_{n-1}$ is $[10-\alpha]$ or word $W_n$ is [10]; key bit F having the value F="1" indicates [10] when word $W_{n-1}$ is $[10-\alpha]$ and word Wn is $[\alpha]$ where $[\alpha]$ is any of [4, 6, 12, 13, 14] or word $W_{n-1}$ is converted in accordance with the table of FIG. 2C; key bit G having the value G="1" indicates that the word $W_{n-1}$ is converted in accordance with the table of FIG. 2B or the word $W_{n-1}$ is [10] when words $W_{n-1}$ and $W_n$ have the form $[10-\alpha]$, where the word $W_n=[\alpha]$ is any of [9, 11, 12, 13, 14]; and key bit H having the value H="1" indicates that the word $W_{n-1}$ is converted in accordance with the Table of FIG. 2A or word $W_{n-1}$ is [10] when words $W_{n-1}$ and $W_n$ have the form $[10-\alpha]$, where word $W_n$ is any of [4, 6, 7].

The discrimination bit Z is determined as follows:

$$Z = E \cdot (G + H)$$

The code corresponding to a value [10] generated in accordance with the conversion table of FIG. 1 has the bits p11 and p12 both at the value "0", so that discrimination bit Z having the value Z="1" means that the word $W_{n-1}$ is [10] when words $W_{n-1}$ and $W_n$ have the form $[10-\alpha]$. If the discrimination bit Z is "1", word $W_n$ must be decoded in accordance with the conversion table of FIG. 3. However, if the discrimination bit Z is "0", the word $W_n$ must be decoded in accordance with the conversion table of FIGS. 1 and 2.

Figure 11:
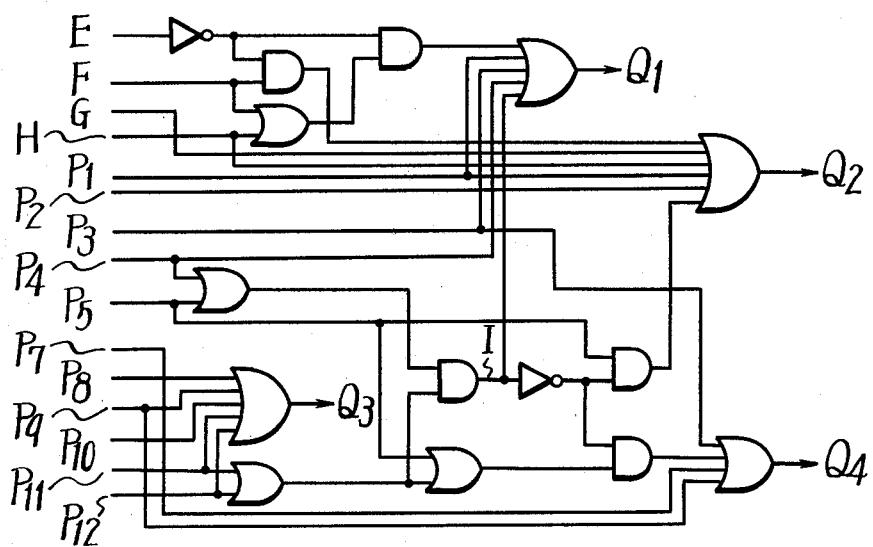

FIG. 11 shows an embodiment of the logic circuit 16 which generates four bits Q1 to Q4 of the data word after carrying out the conversions shown in the Tables of FIGS. 1 and 2. In this case, the four bits Q1 to Q4 are respectively expressed as follows:

$$Q1 = E \cdot (F + H) + p1 + p3 + p4 + I$$

$$Q2 = E \cdot F + G + H + p1 + p2 + p5 \cdot I$$

$$Q3 = p8 + p9 + p10 + p11 + p12$$

$$Q4 = p3 + p7 + p9 + (p5 + p11 + p12) \cdot I$$

where $I = (p4 + p5) \cdot (p11 + p12)$

Figure 12:
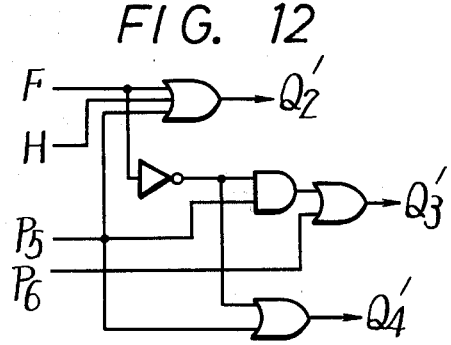

An embodiment of the logic circuit 17 is shown in FIG. 12. The logic circuit 17 carries out the conversion in accordance with the table of FIG. 3 and produces the four bits Q1', Q2', Q3', Q4' of the data word which are expressed as follows:

$$Q1' = G$$

$$Q2' = F + H + p5$$
$$Q3' = F \cdot p5 + p6$$
$$Q4' = F \cdot p5 + p6$$

Figure 13:
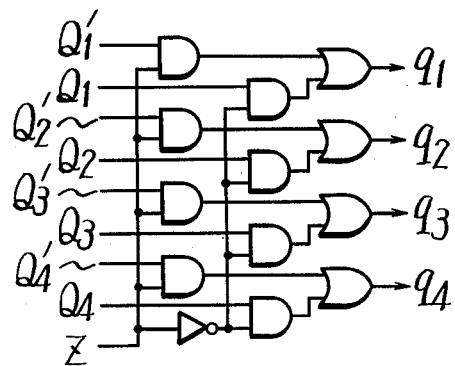

FIG. 13 shows an embodiment of the selector 18 which selects the bits Q1 to Q4 or Q1' to Q4' in accordance with the discrimination bit Z and produces the four bits q1 to q4 of the decoded data word. That is, when discrimination bit Z has the value Z="0", the four bits Q1 to Q4 generated from the logic circuit 16 are used as the four bits of the data word, while when discrimination bit Z has the value Z="1", the four bits Q1' to Q4' are used as the four bits of the data word.

The logic circuit 16 can be formed in accordance with the following modified logic equation rather than to the above logic equation.

$$Q1 = E \cdot (F + G) + p1 + p3 + p4 + p5 \cdot K$$

$$Q2 = E \cdot F + G + H + p1 + p2 + p5 \cdot K$$

$$Q3 = p8 + p9 + p10 + p11 + p12$$

$$Q4 = p3 + p7 + p9 + (p4 + p5) \cdot K + p5 \cdot K$$

where $K = p11 + p12$.

When the code word of twelve bits is converted to or decoded as a data word of four bits according to conventional techniques, twenty-four bits of a continuous two words are discriminated. However, according to the present invention, the key bits E, F, G, and H are produced by using only five bits of the prior word, and the decoding is achieved by the key bits and eleven bits of the word to be decoded, so that the number of bits used for decoding can be reduced significantly and, hence, the construction of the decoder can be simplified.

The present invention mentioned above can be applied to transmit a PCM signal by using a recording and/or reproducing apparatus such as a rotary disc apparatus, a laser light reproduction system, an electrostatic capacitance reproduction system, a VTR or the like.

It will be apparent that many modifications and variations could be effected by one skilled in the art without departing from the spirit or scope of the novel concepts of the present invention which are to be determined by the appended claims.

We claim as our invention

1. A method of modulation and demodulation of data for converting data words of four bits of binary information to converted data words of twelve bits in which successive bits of one type are separated by at least a predetermined plurality of bits of a complementary type, comprising the steps of provided at least two consecutive data words of four bits to a logic device;

detecting whether the at least two consecutive converted words of twelve bits corresponding to said two data words will, in accordance with one predetermined coding scheme, contain successive bits of said one type separated by fewer than said predetermined plurality of bits of said complementary type;

providing converted data words of twelve bits according to said one predetermined coding scheme if it is detected that successive bits of said one type will be separated by at least said predetermined plurality of bits of said complementary type, and providing said converted data words according to another coding scheme if it is detected that said successive bits will be separated by less than said predetermined plurality of bits, so that the sequence of data words of twelve bits so encoded will have successive bits of said one type separated by at least said plurality of bits of said complementary type;

receiving at least two consecutive ones of said converted data words of twelve bits;

determining whether the received converted data words have been provided according to said one coding scheme or said other coding scheme; and demodulating said converted data words of twelve bits into data words of four bits according to the determined coding scheme for the corresponding converted data words of twelve bits.

2. A method of modulation and demodulation according to claim 1, wherein said plurality of bits of said complementary type is five bits.

3. A method of modulation and demodulation according to claim 2, wherein said step of detecting includes detecting whether a first one of said converted data words, according to said one coding scheme, will have a bit of said one type in the last five bits thereof; and detecting whether the next successive one of said converted data words, according to said one coding scheme, will have a bit of said one type in one of the first two bits thereof so that the separation between said bits of said one type is less than five bits; and wherein said step of providing said converted data words includes providing such converted data words according to said other coding scheme if bits of said one type are so detected in said first and next successive converted data words.

4. A method of modulation and demodulation according to claim 3, wherein said other coding scheme includes a first coding routine and a second coding routine for converting said data words when it is detected that said first one of said converted data words will have a bit of said one type at one of the fourth-from-last and fifth-from-last bits thereof, and a bit of said one type within the last three bits thereof, respectively; said step of detecting further includes detecting whether the first one of said converted data words according to said one coding scheme will have a bit of said one type within the last three bits thereof and detecting whether said next successive converted data word according to said one coding scheme will have a bit of said one type within the first three bits thereof; and said step of providing said converted data words includes providing two successive converted data words according to said second coding routine in response to such detecting.

5. Apparatus for modulating data for converting data words of four bits of binary information to converted data words of twelve bits according to a predetermined coding scheme in which successive bits of one type are separated by at least a predetermined plurality of bits of a complementary type, comprising receiving means for receiving a plurality of successive data words of four bits;

logic means coupled with said receiving means to determine whether a bit of said one type in a first one of said converted data words according to said predetermined coding scheme and a bit of said one type in the next successive one of said converted data words according to said predetermined coding scheme will be separated from each other by less than said predetermined plurality of bits of said complementary type;

coding means for selectively providing said converted data words according to said predetermined coding scheme and according to an alternate coding scheme; and selecting means coupled to said coding means and responsive to said logic means to cause said converting means to provide said converted data words according to said predetermined coding scheme and said alternate coding scheme when said bits of one type in said converted data words according to said predetermined coding scheme are respectively determined to be separated by at least said predetermined plurality, and by less than said predetermined plurality of bits of said complementary type.

6. Apparatus for modulating according to claim 5, wherein said predetermined plurality of bits is five bits.

7. Apparatus for modulating according to claim 5, wherein said coding means includes an addressable digital memory.

8. Apparatus for demodulating data for reconverting to data words of four bits converted data words of twelve bits in which successive bits of one type are separated by at least a predetermined plurality of bits of a complementary type, and in which a predetermined coding scheme and an alternate coding scheme have been used so that bits of said one type in successive words are separated by at least said plurality of bits of said complementary type comprising:

receiving means for receiving at least two successive converted data words of twelve bits;

logic means for detecting whether bits of said one type occur at certain predetermined bit positions in said successive converted data words, and providing a discrimination signal in response to such detecting;

means for providing a decoded first data word of four bits according to said predetermined coding scheme and a decoded second data word of four bits according to said alternate coding scheme; and selector means responsive to said discrimination signal to select one of said decoded first and second data words.

9. Apparatus for demodulating according to claim 8, wherein said logic means is coupled to said receiving means to determine the type of bit occurring at a predetermined plurality that is less than all of the data bits for at least one of said at least two successive converted data words.

* * * * *